US012657677B2

(12) United States Patent
Casadio et al.

(10) Patent No.: US 12,657,677 B2
(45) Date of Patent: Jun. 16, 2026

(54) METHOD FOR INSPECTING THE SIDE WALL OF AN OBJECT

(71) Applicant: SACMI COOPERATIVA MECCANICI IMOLA SOCIETA' COOPERATIVA, Imola (IT)

(72) Inventors: Marco Casadio, Imola (IT); Andrea Saiani, Bagnacavallo (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 350 days.

(21) Appl. No.: 17/906,632

(22) PCT Filed: Mar. 22, 2021

(86) PCT No.: PCT/IB2021/052357
§ 371 (c)(1),
(2) Date: Sep. 19, 2022

(87) PCT Pub. No.: WO2021/191769
PCT Pub. Date: Sep. 30, 2021

(65) Prior Publication Data
US 2024/0338805 A1 Oct. 10, 2024

(30) Foreign Application Priority Data
Mar. 23, 2020 (IT) ........................ 102020000006076

(51) Int. Cl.
*G06T 7/00* (2017.01)
*G06T 7/55* (2017.01)

(52) U.S. Cl.
CPC .............. *G06T 7/0002* (2013.01); *G06T 7/55* (2017.01); *G06T 2207/10028* (2013.01)

(58) Field of Classification Search
CPC ..................... G06T 7/0002; G06T 7/55; G06T 2207/10028; G01N 21/90; G01N 21/8851; G01N 2021/845; G01N 21/9045
See application file for complete search history.

(56) References Cited

U.S. PATENT DOCUMENTS

| | | | | |
|---|---|---|---|---|
| 9,430,849 | B2 * | 8/2016 | Agazzi | G01B 11/245 |
| 2005/0041850 | A1 * | 2/2005 | Watkins | G06T 5/94 |
| | | | | 382/145 |

(Continued)

FOREIGN PATENT DOCUMENTS

| | | |
|---|---|---|
| EP | 2297674 A1 | 3/2011 |
| FR | 2939201 A1 | 6/2010 |

(Continued)

OTHER PUBLICATIONS

Rodríguez-Jiménez et al. Xtru3D: Single-View 3D Object Reconstruction from Color and Depth Data. Springer. Computer Vision, Imaging and Computer Graphics—Theory and Applications. VISIGRAPP 2013. Communications in Computer and Information Science, vol. 458. https://doi.org/10.1007/978-3-662-44911-0_11 (Year: 2014).*

(Continued)

*Primary Examiner* — Emily C Terrell
*Assistant Examiner* — Julia Z. Yao
(74) *Attorney, Agent, or Firm* — Chrisman Gallo Tochtrop LLC

(57) ABSTRACT

A method for inspecting the side wall of an object includes the following steps: transporting the object on a conveyor; receiving the object to be inspected in an inspection station positioned along the conveyor, where the axis (A) of the object is oriented along a longitudinal direction (D); capturing a first image through a first camera which views the object from above along an optical path which has at least one component that is parallel to the longitudinal direction (Continued)

(D); deriving a three-dimensional representation of the side wall of the object based on the first image and on reference data; capturing a second image, representing a portion of the side wall of the object, the second image having perspective distortion; deriving a third image representing the portion of the side wall of the object, the third image being without perspective distortion.

12 Claims, 3 Drawing Sheets

(56)                    References Cited

U.S. PATENT DOCUMENTS

| | | | | |
|---|---|---|---|---|
| 2010/0220910 | A1* | 9/2010 | Kaucic | G06T 7/001 |
| | | | | 382/154 |
| 2010/0232683 | A1* | 9/2010 | Fujieda | G06T 7/344 |
| | | | | 382/154 |
| 2018/0268256 | A1* | 9/2018 | Di Febbo | G06V 10/454 |
| 2020/0380229 | A1* | 12/2020 | Peruch | G06K 7/1447 |
| 2021/0350495 | A1* | 11/2021 | Liu | G06T 7/85 |

FOREIGN PATENT DOCUMENTS

| | | | | | |
|---|---|---|---|---|---|
| JP | 5375488 | B2 | 12/2013 | | |
| WO | WO-2006045285 | A1 | * 5/2006 | ............ | G01B 11/04 |
| WO | 2007/110372 | A1 | 10/2007 | | |
| WO | 2009/150020 | A1 | 12/2009 | | |
| WO | 2010/063935 | A1 | 6/2010 | | |
| WO | WO-2011013153 | A1 | * 2/2011 | ............ | G06T 7/001 |
| WO | WO-2018136262 | A1 | * 7/2018 | ......... | G06K 9/00214 |
| WO | WO-2018197297 | A1 | * 11/2018 | .............. | G06T 7/80 |
| WO | WO-2018217077 | A1 | * 11/2018 | ............ | G01N 21/90 |
| WO | WO-2019002114 | A1 | * 1/2019 | .............. | G06T 7/33 |

OTHER PUBLICATIONS

International Search Report for corresponding International Application No. PCT/IB2021/052357 mailed Jun. 14, 2021.
Written Opinion for corresponding International Application No. PCT/IB2021/052357 dated Jun. 14, 2021.

* cited by examiner

Fig. 6
Fig. 7
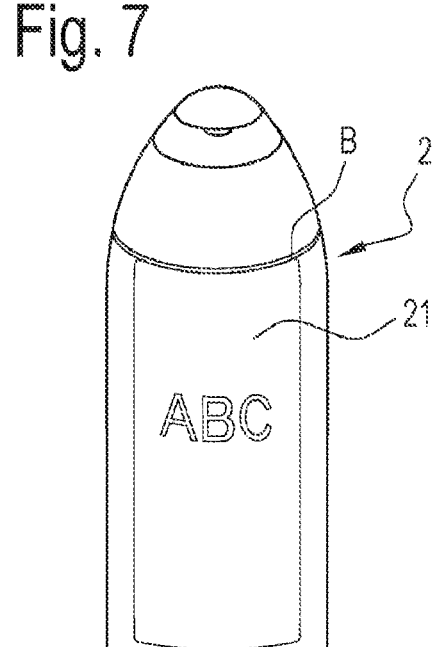
Fig. 8
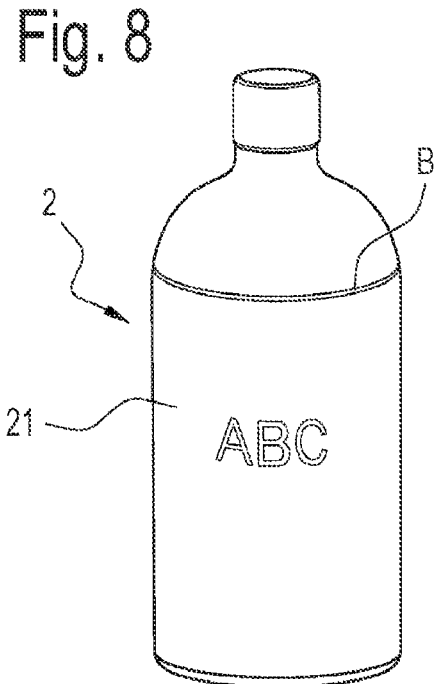
Fig. 9
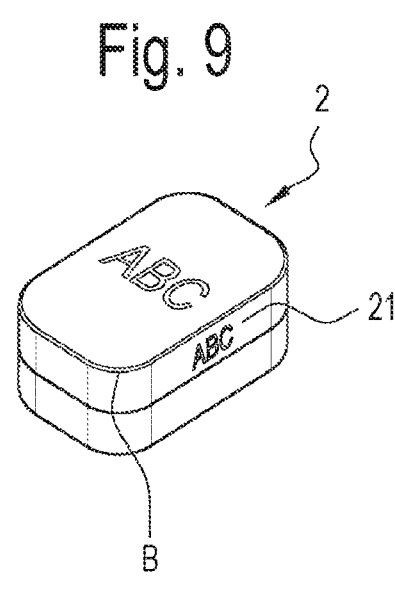

METHOD FOR INSPECTING THE SIDE WALL OF AN OBJECT

CROSS-REFERENCE TO RELATED APPLICATIONS

This application is a U.S. National Stage entry of PCT/ IB2021/052357, filed Mar. 22, 2021, which claims benefit of priority to Italian Application No. 102020000006076 filed Mar. 23, 2020, the entire disclosures of which are hereby incorporated herein by reference.

TECHNICAL FIELD

This invention relates to a method and an apparatus for inspecting the side wall of an object. This invention also relates to a method for processing an image of a side wall of an object.

BACKGROUND ART

This invention addresses the field of inspection of objects such as, for example, containers or phials for substances in powder, gel or liquid form. More specifically, this invention relates to the inspection of the side wall of these objects with a view to detecting any defects in the object or in the label applied thereon. The side wall is inspected by capturing images of it; typically, these images have perspective distortion, which, when processing the images, must be taken into account in order to identify defects correctly.

Known in this field from patent document WO2011013153A1, in the name of this Applicant, is a container inspection method that involves capturing two or more images of the container to define a reference axis of the container and using a previously stored three-dimensional model of the container to form, from the two or more images, a planar, unrolled image of the lateral surface of the container using the axis as a reference. This method has the disadvantage that it requires knowing and having the three-dimensional model of the container available in computer format; further, the need to identify the axis of the container makes this method onerous in terms of computer processing power; moreover, this method does not lend itself to inspecting containers which are not solids of revolution, that is to say, which do not have central symmetry about the reference axis.

Another inspection method is described in patent document WO2007110372; this method, too, involves constructing an unrolled image from a plurality of images of the side wall and is thus onerous in terms of computer processing power. Furthermore, the system requires a large number of cameras, which inevitably raises the cost of the apparatus.

Further methods and systems for inspection are disclosed in patent documents JP5375488B2, FR2939201A1, WO2018/217077A1, EP2297674A1.

DISCLOSURE OF THE INVENTION

The aim of this invention is to provide a method and an apparatus for inspecting the side wall of an object, and a method for processing an image of a side wall of an object, to overcome the above mentioned disadvantages of the prior art.

These aims are fully achieved by the method and apparatus for inspecting objects and the method for processing an image, as described in this disclosure and as characterized in the appended claims.

More specifically, this disclosure relates to a method for inspecting the side wall or lateral surface of an object. The object may be made of plastic, glass or metal. The object may be a container for substances in powder, liquid or gel form; for example, the object may be a bottle, a jar, a box or a tin. The object has a side wall (or lateral surface) which extends round a respective axis. The object also has a bottom wall, connected to the side wall along a lower, outer edge of the side wall. More specifically, the bottom wall may be oriented perpendicularly to the axis of the object. The object preferably has a top wall; the top wall is connected to the side wall along an upper outer edge of the side wall. The lower, outer edge surrounds the axis of the object; the upper outer edge surrounds the axis of the object.

The method comprises a step of transporting the object on a conveyor. The conveyor may be, for example, a belt conveyor, configured to transport objects along a conveying direction; the conveyor may be a carousel, configured to transport objects along a circular trajectory around an axis of rotation. Preferably, the conveyor transports the objects in succession. In an embodiment, the conveyor transports singulated objects; in another embodiment, the objects may touch each other. Whatever the case, the objects are preferably inspected one at a time (in effect, the first and second images, described further on in this disclosure, are captured one by one in rhythmic sequence for each sample).

Preferably, the conveyor transports the objects with the bottom wall resting on the conveyor; the conveyor may also transport the objects while holding them by a part of them (for example, the neck) or the objects may be held by suction.

The method comprises a step of receiving the object to be inspected into an inspection station. The inspection station is located along the conveyor. In the inspection station, the object is received with its axis oriented along a longitudinal direction.

The method comprises a step of capturing (or taking) a first image. The first image is captured by a first camera which views the object from above along an optical path (or viewing axis) which has at least one component that is parallel to the longitudinal direction. Thus, the first image represents at least part of the top wall and/or of the upper outer edge of the object.

The method comprises a step of deriving a three-dimensional representation of the side wall of the object, based on the first image and on reference data. Thus, the first image is processed as a function of reference data to derive the three-dimensional representation. In an embodiment, the three-dimensional representation is (or includes) a three-dimensional model of the object.

In an embodiment, the reference data are stored in a memory and retrieved selectively as a function of input data. In an embodiment, the reference data are received in the form of input data. The reference data represent one or more geometrical characteristics of the object; thus, the reference data depend on the size and format of the object.

The method comprises a step of capturing a second image; the second image represents a portion of the side wall. The second image has perspective distortion. The perspective distortion of the second image is random and depends on the orientation of the object in a plane perpendicular to the longitudinal direction. In effect, the conveyor ensures that the objects are received in the inspection station with their axes oriented along the longitudinal direction but each object may be rotated about its respective axis; thus, its side wall may have a random angulation relative to the inspection station; this angulation produces in the second image a perspective distortion which varies from one object to another.

The method comprises a step of processing the second image; the second image is processed as a function of the three-dimensional representation. More specifically, the step of processing includes identifying a first plurality of points on the three-dimensional representation and identifying a second plurality of points (or pixels) on the second image. Thus, processing includes applying a correlation between the first plurality of points and the second plurality of points.

More specifically, in an embodiment, each point of the lateral surface of the object in the second image is correlated with a point on the three-dimensional representation.

In another embodiment, only a subset of the points of the second image is correlated with a correspondent subset of points of the three-dimensional representation; in such a way, the processing step is simpler, although the results may be less accurate. In this embodiment, the method provides to identify in the second image said second plurality of points, which includes only a subset of the points of the second image, to identify in the three-dimensional representation a correspondent first plurality of points, and to correlate the points of the second plurality with the points of the first plurality.

Hence, processing includes perspective transformation, which involves correlating each point on the three-dimensional representation with a certain (unique) point on the second image.

Processing includes deriving a third image representing the portion of the side wall of the object. The third image is derived by a perspective transformation of the second image as a function of the three-dimensional representation. The third image does not have perspective distortion (or is less distorted than the second image).

It should be noted that the third image corresponds to a (second) image that would be obtained if the object had a predetermined, nominal orientation in the inspection station and/or if the axis of the object coincided with the predetermined longitudinal axis; thus, the third image is independent of the random orientation that the object actually has in a plane perpendicular to its axis (and to the longitudinal direction), and/or of the deviation, if any, between the axis of the object and the longitudinal axis (or direction). The third image is thus spatially uniform.

The third image is made available to identify defects in the side wall of the object or in the label applied thereon.

In an embodiment, the method comprises a step of processing the third image to identify defects; for example, the third image may be compared with a reference image representing a side wall of an object that is free of defects (oriented according to the nominal orientation and whose axes coincide with the predetermined longitudinal axis); in another example, the third image may be compared with images of side walls of defective objects (also oriented according to the nominal orientation and whose respective axis coincides with the predetermined longitudinal axis).

In an embodiment, the third image is processed by a self-learning system; preferably, the self-learning system includes neural networks (for example, convolutional neural networks). Neural networks are trained to recognize defects, if any, in the object; neural networks can be trained from objects with defects and/or objects without defects.

Preferably, the first camera, which is used to capture the first image, is positioned above the object in the inspection station. More specifically, the optical path (or viewing axis) of the first camera is preferably parallel to the longitudinal direction. In an embodiment, the optical path of the first camera is perpendicular to the surface of the conveyor.

Preferably, the second image is captured by a second camera. The second camera is different from the first camera. More specifically, the second camera has an optical path (or viewing axis) different from the optical path of the first camera. The optical path of the second camera is incident upon the side wall of the object; for example, the optical path of the second camera may be orthogonal to the longitudinal direction.

It should be noted the first camera and the second camera form part of the same optical device. Preferably, the first and second cameras are calibrated according to the same spatial reference system. Thus, the reference system is common to the first and the second camera. In an embodiment, the first and the second camera are connected to each other in a stereo configuration. In an embodiment, the method may comprise a step of calibrating the first and the second camera according to the same spatial reference.

In an embodiment, the first and second images are both captured by the first camera; in this case, the optical path of the first camera is inclined relative to the longitudinal direction so as to view the object both from above and from the side. For example, in this case, the first camera may have an optical path that is oriented at an angle of between 40° and 50° (specifically, 45°) to the longitudinal direction. In this case, too, the first camera takes a single snapshot which is processed to derive from it both the first image and the second image.

The reference data, used to derive the three-dimensional representation of the object, preferably include a distance of an upper outer edge of the lateral surface of the object from the first camera. This distance is defined along the longitudinal direction. By upper outer edge is meant the edge which, in a view of the object from above, defines the boundary of the object. The step of deriving the three-dimensional representation thus includes a step of identifying, on the first image, a line representing at least one portion of the upper outer edge of the lateral surface of the object; this line may be a curved line or a straight line or a polygonal line depending on the geometry of the object. The line is a geometric representation of the upper outer edge (or of a portion thereof).

In an embodiment, the line also represents a boundary of a cap of the object (viewed from above); in this embodiment, therefore, the line includes a first portion, representing the upper outer edge of the side wall, and a second portion representing the boundary of the cap; in an example, the second portion may be surrounded by the first portion.

Preferably, the reference data include a height of the side wall of the object (that is, a distance of the upper outer edge from the base of the object). It should be noted that the reference data may, in the same way, include, not the distance of the first camera from the upper outer edge and the height of the side wall of the object but the distance of the first camera from the base wall and the height of the side wall of the object (in effect, the distance of the first camera from the upper outer edge is obtained from these by subtraction). In the case where the objects rest on the conveyor that is transporting them, the distance of the first camera from the base wall of the object is defined by the distance of the first camera from the surface of the conveyor on which the object rests. It should be noted, generally speaking, that the reference data include at least two of the following quantities: distance of an upper outer edge of the lateral surface of the object from the first camera, height of the side wall of the object, distance of the first camera from the base wall of the object (or from the conveyor); in effect, from two of these quantities the third can be obtained. The three-dimensional representation is derived from the aforementioned line by projecting the line along the longitudinal direction for a height equal to the height of the side wall of the object. In the case where the line represents only a portion of the upper edge, it is possible to obtain a partial three-dimensional representation (representing only a portion of the side wall of the object—the portion to be inspected) and/or it is possible to reconstruct the remaining portion of the upper edge (for example, by assuming that it has a certain symmetry) and to then downwardly project the line representing the edge (including the portion represented in the second image and the reconstructed portion) to obtain the three-dimensional representation.

More specifically, projecting the line downwardly means projecting it towards the base wall of the object, away from the first camera. Thus, the line obtained from the first image defines, or approximates, an upper boundary (or boundary portion) of the object, and the three-dimensional representation is obtained by projecting (or extruding) the boundary for a known height, equal to the height of the object. Thus, it should be noted that the inspection method according to this disclosure does not need to be provided with a three-dimensional model of the object from the start; in effect, the three-dimensional representation (in some cases, approximate) is constructed using reference data such as the height of the object and the distance of the object from the camera; the reference data are less burdensome to store and to process than the three-dimensional model.

In an embodiment, the method comprises a step of learning, comprising a step of storing the profile of the line and/or updating the stored profile; that way, in the successive objects, the line is identified not only as a function of the first image but also as a function of the stored profile.

It should be noted that the lateral surface of the object is preferably oriented substantially in parallel with the longitudinal direction (and with the axis of the object). By substantially in parallel is meant that variations in the orientation of the lateral surface relative to the longitudinal direction are acceptable; the extent of such variations in the orientation must, however, be limited. For example, variations in orientation between +30° and −30° (preferably, between +20° and −20°, or between +15° and −15°) relative to the longitudinal direction are acceptable.

It should be noted that the method of this disclosure advantageously applies to objects that are not solids of revolution; for example, it applies to containers whose shape is oval or elliptic or rectangular, having a side wall that is parallel or substantially parallel to the axis of the object.

This disclosure also provides an apparatus for inspecting the side wall of an object.

The apparatus comprises a conveyor, configured to transport the object. The conveyor may include a belt or a carousel. The conveyor is configured preferably to transport the object resting on it. The conveyor is configured preferably to transport a plurality of objects, keeping each with its respective axis parallel to a longitudinal direction. The conveyor is configured preferably to transport a plurality of objects in succession. In an embodiment, the conveyor is configured to transport singulated objects.

The apparatus comprises an inspection station, located along the inspection path. The inspection station is configured to receive the object to be inspected oriented with its axis along the longitudinal direction.

The inspection station comprises an optical device for capturing images. The optical device comprises a first camera, configured to capture a first image of the object from above. The first camera has an optical path which has at least one component that is parallel to the longitudinal direction.

The apparatus comprises a control unit. The control unit has access to a memory that contains reference data. In an embodiment, the apparatus comprises an interface, connected to the memory and configured to receive the reference data.

The control unit is configured to derive a three-dimensional representation of the side wall of the object, based on the first image and on the reference data.

The control unit is configured to perform a step of processing the second image as a function of the three-dimensional representation. Processing includes perspective transformation; in other words, processing includes: identifying a first plurality of points on the three-dimensional representation, identifying a second plurality of points on the second image, applying a correlation between the first plurality of points and the second plurality of points; deriving a third image representing the portion of the side wall of the object; the third image does not have perspective distortion and/or is less distorted than the second image.

Further, the size of the object on the third image may be adjusted based on the real position of the object in the inspection station. For example, if the object is positioned closer to or further from the second camera (or the camera which captures the image of the side wall) compared to a nominal position, the effect is that of zooming in or zooming out on the object to compensate for the difference from the nominal position. In other words, at the nominal position, the axis of the object coincides with a predetermined longitudinal axis; if the axis of the object, although parallel to the longitudinal axis, is spaced from the predetermined longitudinal axis, the third image shows the object as if it were positioned with its axis coinciding with the predetermined longitudinal axis.

The control unit is configured to make the third image available to identify defects in the portion of the side wall of the object (or in the label applied thereon). In an embodiment, the control unit is configured to process the third image and to identify defects.

It should be noted that the reference data preferably include a distance of an upper outer edge of the lateral surface of the object from the first camera. The control unit is configured to identify, on the first image, a line representing at least one portion of the upper outer edge of the lateral surface of the object and to derive the three-dimensional representation from that line.

Preferably, the reference data include a height of the side wall of the object. The control unit is configured to derive the three-dimensional representation by projecting the line downwardly for a distance equal to the height of the side wall of the object.

The optical device preferably comprises a second camera which has an optical path different from that of the first camera and which is configured to capture the second image.

In another embodiment, the first camera is configured to capture both the first image and the second image.

In an embodiment, the apparatus comprises an illuminator configured to illuminate the object (specifically, its lateral surface) located in the inspection station. More specifically, the illuminator may be a structured illuminator, configured to illuminate the object with structured light (that is, the illuminator projects a light pattern onto the object). The structured illuminator is particularly useful in the case where there is only one camera with an optical path that is inclined relative to the longitudinal direction, to be able to correctly identify the upper edge.

This disclosure also provides a method for processing an image of a side wall of an object. The processing method comprises a step of deriving a three-dimensional representation of the side wall of the object, starting from a first image of the object, viewed from above, and from reference data. The processing method comprises a step of identifying a first plurality of points on the three-dimensional representation. The processing method comprises a step of identifying a second plurality of points (pixels) on the second image. The processing method comprises a step of deriving a further (or third) image representing the portion of the side wall of the object. The further image is obtained by perspective transformation of that image, based on the three-dimensional representation. Thus, the further image does not have perspective distortion or is less distorted than that image. More generally speaking, the processing method corresponds to the step of processing the second image of the inspecting method described in this disclosure.

This disclosure also provides a computer program comprising operating instructions configured to perform the steps of the processing method according to one or more aspects of this disclosure, when run on a computer.

BRIEF DESCRIPTION OF DRAWINGS

These and other features will become more apparent from the following detailed description of a preferred embodiment, illustrated by way of non-limiting example in the accompanying drawings, in which:

FIGS. 6-9 illustrate examples of containers that can be inspected with the apparatus of FIG. 1;

DETAILED DESCRIPTION OF PREFERRED EMBODIMENTS OF THE INVENTION

Figures 1, 2, 3, 4, 5:
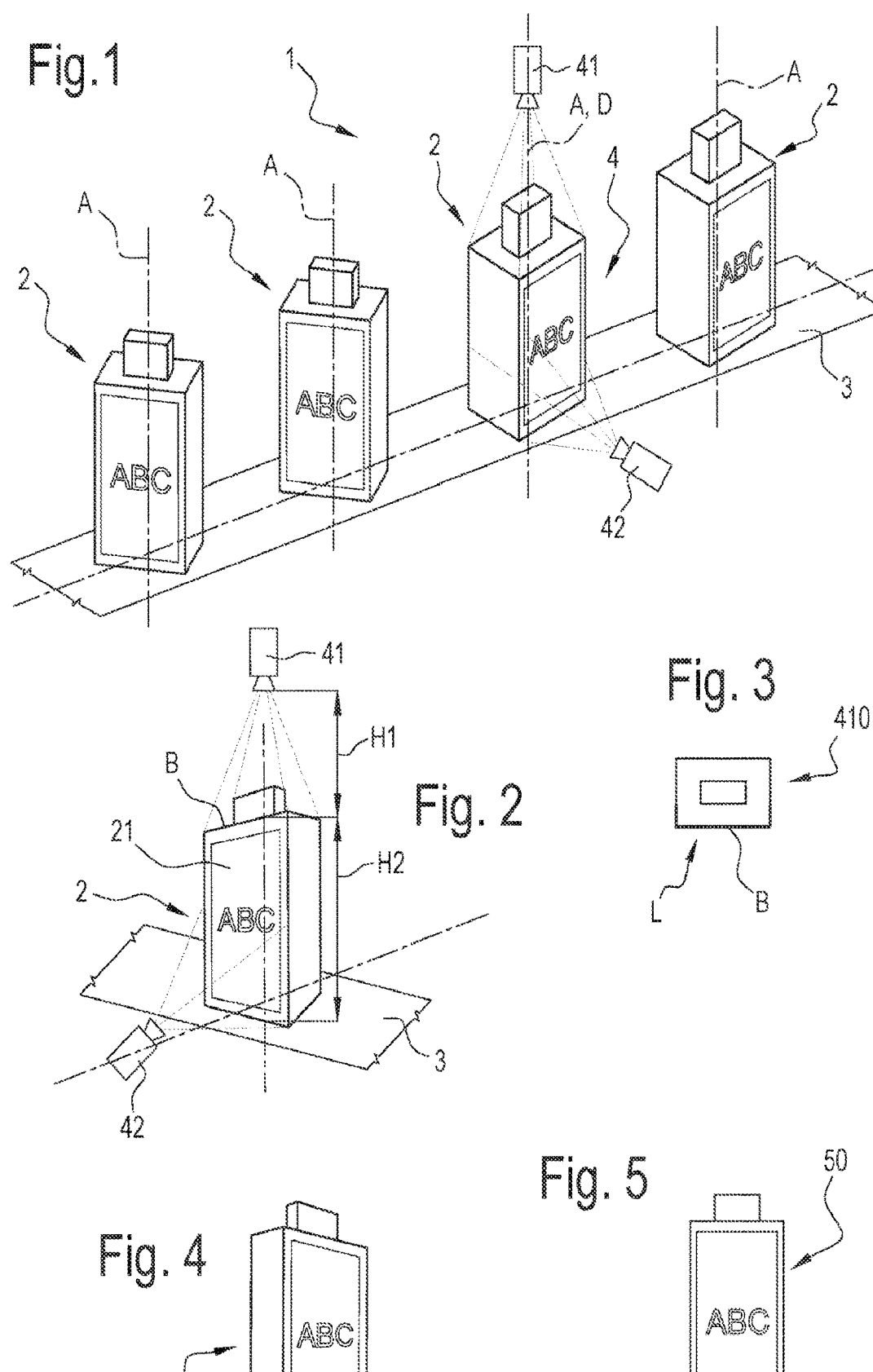
FIG. 1 illustrates an apparatus for inspecting the side wall of an object according to this disclosure.
FIG. 2 illustrates an inspection station of the apparatus of FIG. 1.
FIG. 3 illustrates an example of a first image.
FIG. 4 illustrates an example of a second image.
FIG. 5 illustrates an example of a third image.
Figure 10:
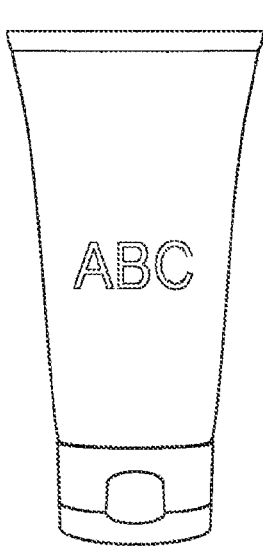
FIG. 10 shows a container that is unsuitable for inspection with the apparatus of FIG. 1.
Figure 11:
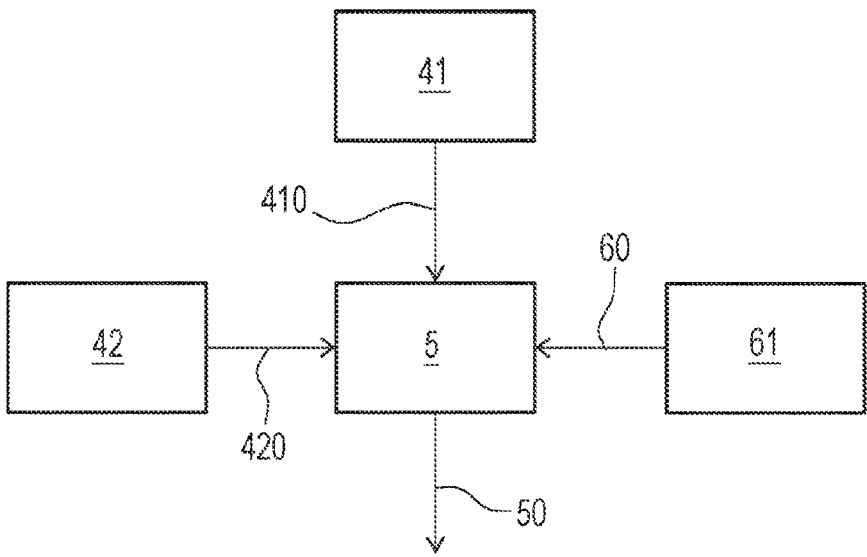
FIG. 11 schematically represents the apparatus of FIG. 1.

With reference to the accompanying drawings, the numeral 1 denotes an apparatus for inspecting a side wall 21 of an object (or container) 2. The object (or container) 2 includes a base wall, a side wall connected to the base wall and a top wall connected to the side wall. The top wall may define an opening of the container. The side wall 21 extends round an axis A of the object 2.

The apparatus 1 comprises a conveyor 3; in an embodiment, the conveyor 3 includes a conveyor belt and the object 2 is transported with its base wall resting thereon and with its axis A oriented in parallel with a longitudinal direction D. The longitudinal direction D is orthogonal to the feed direction of the conveyor 3 and/or to the surface of the conveyor 3 which the object 2 rests on. Preferably, the conveyor 3 transports a plurality of objects 2 in succession and keeping them with their axes A oriented in parallel with the longitudinal direction D. In an embodiment, the conveyor 3 is configured to move continuously and/or to feed the objects 2 continuously along the feed direction of the conveyor 3. In another embodiment, the conveyor 3 is configured to move in a succession of periods of movement alternated with periods of stopping.

In an embodiment, the surface of the conveyor 3 has a colour that provides a high contrast with the colour of the object 2. In an embodiment, the surface of the conveyor 3 includes a portion having a first colour and a portion having a second colour, different from the first colour; these two portions may be alongside each other along the feed direction of the conveyor; thus, a portion of the object rests on the first portion and a portion of the object rests on the second portion; that way, depending on the colour of the object, one portion or the other is visible more clearly and the portion that has more contrast with the conveyor is used to construct the three-dimensional representation from one time to the next.

The apparatus 1 comprises an inspection station 4. The inspection station 4 is located along the conveyor 3. The inspection station 4 is configured to receive one object 2 at a time. The axis A of the object 2 received in the inspection station 4 is oriented in the longitudinal direction D (or parallel therewith).

The inspection station 4 (or, more generally speaking, the apparatus 1) comprises a first camera 41. The first camera 41 is located above the object 2 positioned in the inspection station 4; thus, the camera 41 views the object 2 from above. Preferably, the first camera 41 has an optical path that is oriented in parallel with the longitudinal direction D. The first camera 41 is configured to capture a first image 410. The first image 410 is preferably a view of the object 2 from above. Thus, the first image 410 represents the top wall of the object 2; also represented on the first image 410 is an upper outer edge B of the lateral surface 21. In practice, the upper outer edge B of the lateral surface forms the boundary of the object 2 on the first image 410, taken from above.

The inspection station 4 (or, more generally speaking, the apparatus 1) comprises a second camera 42. The second camera 42 is located alongside the object 2 positioned in the inspection station 4 and has an optical path that is incident upon the longitudinal direction D. The second camera 42 is configured to capture a second image 420. The second image 420 represents the side wall 21 of the object 2 (or a portion or face of it). Since each object 2 has a random orientation about the axis A (and different from a nominal orientation), the second image 420 of each object 2 has a respective perspective distortion which varies from one object 2 to another.

Preferably, the object 2 is at the same position the moment the first camera 41 captures the first image 410 and the moment the second camera 42 captures the second image. More specifically, if the conveyor 3 transports the object with continuous motion, the first image 410 and the second image 420 may be captured simultaneously or at successive time instants; in effect, in the latter case, the control unit can receive as input the feed speed of the conveyor 3 (which is usually tracked by an encoder) and can then process the first and second images 410, 420 as a function of that speed, taking into account the spatial translation which the object 2 has undergone from one time instant to the next.

If the conveyor 3 transports the objects in periods of movement alternated with periods of stopping, the conveyor 3 stops when the object 2 is in the inspection station and, during the period of stopping, the first image 410 and the second image 420 are captured (not necessarily simultaneously). The apparatus 1 comprises a control unit (or processing unit) 5. The control unit 5 is connected to the first camera 41 and to the second camera 42 to receive the first image 410 and the second image 420. The control unit 5 is configured to identify, on the first image 410, a line L representing at least one portion of the upper outer edge B of the lateral surface 21 of the object 2. The control unit 5 is connected to a memory or database 61 (which may itself form part of the apparatus 1). The memory 61 contains reference data 60. The reference data 60 include at least two of the following data items: a distance H1 of the upper edge B from the first camera 41 along the longitudinal direction D; a height H2 of the side wall 21 along the longitudinal direction D (that is, a distance of the upper edge B from the base or from the conveyor 3; a distance (equal to the sum of H1 plus H2) of the camera 41 from the base or from the conveyor 3. The control unit 5 is configured to receive these reference data items 60 from the memory 61. In an embodiment, the control unit 5 is configured to process the reference data 60 to obtain the distance H1 and/or the height H2 (for example, if the reference data 60 include H2 and the sum of H1 and H2, the control unit 5 derives H1 by subtraction).

The control unit 5 is configured to derive from the first image 410, from the distance H1 and from the height H2 a three-dimensional representation (that is, a three-dimensional model) of the object 2. More specifically, the control unit 5 zooms in and out on the line L as a function of the first height H1 and then downwardly projects the line L (enlarged or reduced in size by zooming, as necessary) for a height equal to the height H2.

The control unit 5 then performs a perspective transformation on the second image 420, based on the three-dimensional representation thus constructed. Said perspective transformation includes identifying a second plurality of points in the second image 420, identifying a correspondent first plurality of points on the three-dimensional representation, applying a correlation between the first plurality of points and the second plurality of points, and on the basis of said correlation deriving a third image 50. More specifically, in an embodiment, the control unit 5 associates with each point or pixel on the second image 420 a point on the three-dimensional representation (or model) and thus derives a third image 50. The third image 50 represents the side wall 21 of the object 2, without perspective distortion or with less perspective distortion than the second image 420. Further, the axis A of the object 2 may not coincide exactly with the longitudinal axis (or direction) D and may be offset therefrom. In this case, the control unit 5 transforms the second image 420 (by zooming in or out) so that the third image 50 generated represents the side wall 21 of the object 2 as if its axis A coincided with the longitudinal axis (or direction) D. The control unit 5 may then make the third image 50 available for subsequent analyses to detect defects in the side wall 21 or in the label applied thereon, or it may itself perform the analyses.

The invention claimed is:

1. A method for inspecting a side wall of an object, wherein the side wall of the object extends round a respective axis, the method comprising the following steps:

transporting the object on a conveyor;

receiving the object to be inspected in an inspection station positioned along the conveyor, where the respective axis of the object is oriented along a longitudinal direction;

capturing a first image through a first camera which views the object from above along an optical path which has at least one component that is parallel to the longitudinal direction;

deriving a three-dimensional representation of the side wall of the object based on the first image and on reference data;

capturing a second image of the object through the first camera or through a second camera, representing a portion of the side wall of the object, the second image having perspective distortion;

processing the second image as a function of the three-dimensional representation, wherein the step of processing includes:

identifying a first plurality of points on the three-dimensional representation, identifying a second plurality of points on the second image, applying a correlation between the first plurality of points and the second plurality of points, deriving a third image, the third image being obtained by perspective transformation of the second image, based on the three-dimensional representation, representing the portion of the side wall of the object, the third image being without perspective distortion or being less distorted than the second image;

wherein the third image is made available to identify defects in the portion of side wall of the object, wherein the reference data include a distance of an upper outer edge of a lateral surface of the object from the first camera, wherein the step of deriving the three-dimensional representation includes identifying, on the first image, a line representing at least one portion of the upper outer edge of the lateral surface of the object, and wherein the reference data also include a height of the side wall of the object, wherein the three-dimensional representation is derived from the line by projecting the line along the longitudinal direction for a height equal to the height of the side wall of the object.

2. The method according to claim 1, wherein the first camera is located above the object positioned in the inspection station.

3. The method according to claim 2, wherein the second image is captured by a second camera having an optical path different from the optical path of the first camera.

4. The method according to claim 3, wherein the first and the second cameras are calibrated according to the same spatial reference system.

5. The method according to claim 1, wherein the conveyor feeds a plurality of objects each with a respective axis in succession and keeps the respective axis of each of the plurality of objects oriented in parallel with the longitudinal direction.

6. The method according to claim 1, wherein a lateral surface of the object is oriented substantially in parallel with the longitudinal direction.

7. The method according to claim 1, wherein in said step of processing, each point of the second plurality of points on the second image is associated with a point of the three-dimensional representation.

8. An apparatus for inspecting a side wall of an object, wherein the side wall of the object extends round a respective axis, the apparatus comprising:

a conveyor configured to transport the object;

an inspection station, disposed along the conveyor and configured to receive the object to be inspected oriented with the respective axis of the object along a longitudinal direction; wherein the inspection station comprises an optical device for capturing images;

wherein the optical device comprises a first camera, configured to capture a first image of the object from above, wherein the first camera has an optical path which has at least one component that is parallel to the longitudinal direction, wherein the optical device is configured to capture a second image of the object, through the first camera or through a second camera, representing a portion of the side wall of the object to be inspected;

a control unit, including a processor, configured for:

deriving a three-dimensional representation of the side wall of the object based on the first image and on reference data;

performing a step of processing the second image as a function of the three-dimensional representation, wherein the step of processing includes:

identifying a first plurality of points on the three dimensional representation, identifying a second plurality of points on the second image, applying a correlation between the first plurality of points and the second plurality of points;

deriving a third image, the third image being obtained by perspective transformation of the second image, based on the three-dimensional representation representing the portion of the side wall of the object, the third image being without perspective distortion or being less distorted than the second image;

making the third image available to identify defects in the portion of the side wall of the object, wherein the reference data include a distance of an upper outer edge of a lateral surface of the object from the first camera and wherein the control unit is configured to identify, on the first image, a line representing at least one portion of the upper outer edge of the lateral surface of the object and to derive the three-dimensional representation from the line, and wherein the reference data also include a height of the side wall of the object, wherein the control unit is configured to derive the three-dimensional representation by projecting the line downwardly for a height equal to the height of the side wall of the object.

9. The apparatus according to claim 8, wherein the optical device comprises a second camera configured to capture the second image, wherein the second camera has an optical path that is different from the optical path of the first camera.

10. The apparatus according to claim 8, comprising a structured illuminator, configured to illuminate the object positioned in the inspection station with structured light.

11. A method for processing an image of a side wall of an object, wherein the image has perspective distortion, the method comprising the following steps:

deriving, by means of a control unit, which includes a processor, a three-dimensional representation of the side wall of the object based on a first image, captured through a first camera, of the object viewed from above and on reference data;

identifying, by means of the control unit, a first plurality of points on the three-dimensional rep resentation;

identifying, by means of the control unit, a second plurality of points on a second image representing a portion of the side wall of the object, captured through a first camera or a second camera;

applying, by means of the control unit, a correlation between the first plurality of points and the second plurality of points;

deriving, by means of the control unit, a further image, the further image being obtained by perspective transformation of the second image, based on the three-dimensional representation, representing a portion of the side wall of the object, the further image being without perspective distortion or being less distorted than the second image, wherein the step of deriving the three-dimensional representation includes identifying, on the first image, a line representing at least one portion of an upper outer edge of a lateral surface of the object, and wherein the reference data include a distance of an upper outer edge of the lateral surface of the object from the first camera, and wherein the reference data also include a height of the side wall of the object, wherein the three-dimensional representation is derived from the line by projecting the line along the longitudinal direction for a height equal to the height of the side wall of the object.

12. The method according to claim 11, wherein, in the method for processing the image of the side wall of the object, each point of the second plurality of points on a second image is associated with a point of the three-dimensional representation.

* * * * *